(12) United States Patent
Liebeno et al.

(10) Patent No.: US 9,259,051 B2
(45) Date of Patent: Feb. 16, 2016

(54) SYSTEMS AND METHODS FOR UTILIZING PHYLON BISCUITS TO PRODUCE A REGIONALIZED-FIRMNESS MIDSOLE

(71) Applicant: NIKE, Inc., Beaverton, OR (US)

(72) Inventors: Bret P. Liebeno, West Linn, OR (US); Anthony C. Dean, Ellijay, GA (US); Thomas Berend, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/690,844

(22) Filed: Apr. 20, 2015

(65) Prior Publication Data

US 2015/0223563 A1 Aug. 13, 2015

Related U.S. Application Data

(63) Continuation of application No. 13/122,697, filed on Jun. 10, 2011, now Pat. No. 9,049,901.

(51) Int. Cl.
*B32B 37/00* (2006.01)
*A43B 13/16* (2006.01)

(52) U.S. Cl.
CPC ...................................... *A43B 13/16* (2013.01)

(58) Field of Classification Search
CPC ........................................................ A43B 13/16
USPC ........................................................ 264/45.4
See application file for complete search history.

(56) References Cited

U.S. PATENT DOCUMENTS 4,642,911 A 2/1987 Talarico
5,972,257 A 10/1999 Liu
6,061,929 A 5/2000 Ritter
7,056,459 B2 6/2006 Park
7,290,356 B2 11/2007 Fuerst
(Continued)

FOREIGN PATENT DOCUMENTS

CN 1163190 A 10/1997
JP 2007275275 A 10/2007
(Continued)

OTHER PUBLICATIONS

Chinese Search Report dated Jan. 29, 2013 in Application No. 200980147151.7, 2 pages.
(Continued)

*Primary Examiner* — Joseph S Del Sole
*Assistant Examiner* — John Robitaille
(74) *Attorney, Agent, or Firm* — Shook, Hardy & Bacon L.L.P.

(57) ABSTRACT

A method for producing a regionalized-firmness midsole utilizing a heat press, and a description of the resultant product, are provided. Initially, the method involves providing a plurality of pre-formed phylon biscuits. Typically, the plurality of biscuits includes at least a first biscuit that has a first density and a second biscuit that has a second density. The method may further include the steps of arranging the biscuits into a receiving area of the heat press, and integrating the plurality of biscuits to form the midsole by activating the heat press. Integrating the biscuits includes raising the biscuits above a threshold temperature, and causing the biscuits to expand such that each of the plurality of biscuits couples with another of the biscuits to form a midsole with two or more degrees of firmness located at distributed regions thereon.

18 Claims, 11 Drawing Sheets

(56) References Cited

U.S. PATENT DOCUMENTS

| | | |
|---|---|---|
| 2004/0041292 A1 | 3/2004 | Chen et al. |
| 2004/0261297 A1 | 12/2004 | Park |
| 2006/0061000 A1 | 3/2006 | Chun et al. |
| 2008/0005856 A1 | 1/2008 | Hung |
| 2011/0099845 A1* | 5/2011 | Miller .................... A43B 7/142 36/91 |

FOREIGN PATENT DOCUMENTS

| | | |
|---|---|---|
| WO | 2007123688 A2 | 11/2007 |
| WO | 2007139832 A2 | 12/2007 |

OTHER PUBLICATIONS

Chinese Office Action dated Feb. 6, 2013 in Application No. 200980147151.7, 3 pages.

European Search Report dated Dec. 5, 2013 in Application No. 09816992.3, 11 pages.

Non-Final Office Action dated Jul. 7, 2014 in U.S. Appl. No. 13/122,697, 10 pages.

European Extended Search Report dated Feb. 17, 2015 in Application No. 09816992.3, 6 pages.

Notice of Allowance dated Jan. 20, 2015 in U.S. Appl. No. 13/122,697, 8 pages.

* cited by examiner

SYSTEMS AND METHODS FOR UTILIZING PHYLON BISCUITS TO PRODUCE A REGIONALIZED-FIRMNESS MIDSOLE

CROSS-REFERENCE TO RELATED APPLICATIONS

This application is a Continuation application of U.S. application Ser. No. 13/122,697, filed Jun. 10, 2011 and entitled "Systems and Methods for Utilizing Phylon Biscuits to Produce a Regionalized-Firmness Midsole" the entirety of which is incorporated herein by reference.

STATEMENT REGARDING FEDERALLY SPONSORED RESEARCH OR DEVELOPMENT

Not applicable.

TECHNICAL FIELD

The present invention relates generally to a system and method for producing a regionalized-firmness midsole for an article of footwear. In particular, aspects of the invention include generating a midsole that has a topography of varying degrees of firmness distributed thereover.

BACKGROUND OF THE INVENTION

One skilled in the art of footwear manufacturing and design will realize that a midsole component of a shoe may provide much of the shoe's cushioning system. Generally, midsoles are manufactured from foam and provide a consistent firmness throughout. However, in order to reduce sports-related injuries or to improve performance aspects of the shoe (e.g., stability, durability, etc.), a midsole that exhibits a variety of levels of firmness is desirable.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Generally, embodiments of the present invention relate to a method for producing a regionalized-firmness midsole utilizing a heat press. Initially, the method involves providing a plurality of pre-formed phylon biscuits and/or pelletized phylon. The plurality of biscuits may be formed by employing an injection process that includes heating phylon pellets until molten and injecting them into pre-forms (e.g., molding cavities) within an injection mold. Typically, the plurality of biscuits includes at least a first biscuit that has a first density and a second biscuit that has a second density. The method may further include the steps of arranging the biscuits into a receiving area (e.g., molding cavity) of the heat press, and integrating the plurality of biscuits to form the midsole by activating the heat press. Or, in other embodiments, the method may include the steps of placing the pelletized phylon into the receiving area and locating one or more phylon biscuits within the receiving area, where the location of the phylon biscuit(s) corresponds to a location of increased or decreased hardness within a resultant phylon article. Generally, arranging or locating the biscuits into the receiving area of the heat press involves organizing a first biscuit and a second biscuit according to a pattern based on customer specifications. Next, the biscuits and/or the pelletized phylon may be integrated with each other to form the resultant phylon article. In an exemplary embodiment, integrating the biscuits and/or the pelletized phylon includes, in part, raising the biscuits and/or the pelletized phylon above a threshold temperature, and causing the biscuits and/or the pelletized phylon to expand such that each of the plurality of biscuits and/or the pelletized phylon couples with one another. In particular, the expansion is partially caused by activating a foaming agent incorporated within each of the biscuits and/or the pelletized phylon. In other embodiments, integrating the plurality of biscuits and/or the pelletized phylon causes each of the biscuits and/or the pelletized phylon to attain shock absorption characteristics, thereby generating a midsole with two or more degrees of firmness. In general, the two or more degrees of firmness may be located at distributed regions of the midsole that may be targeted for example in accordance with customer specifications or design considerations. Also, two or more colors may be located at distributed regions of the midsole in accordance with a color characteristic of each of the biscuits and/or the pelletized phylon. Upon being expanded into the midsole, the midsole is removed from the receiving area and, typically, advanced to a stabilization zone to cool and resize.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
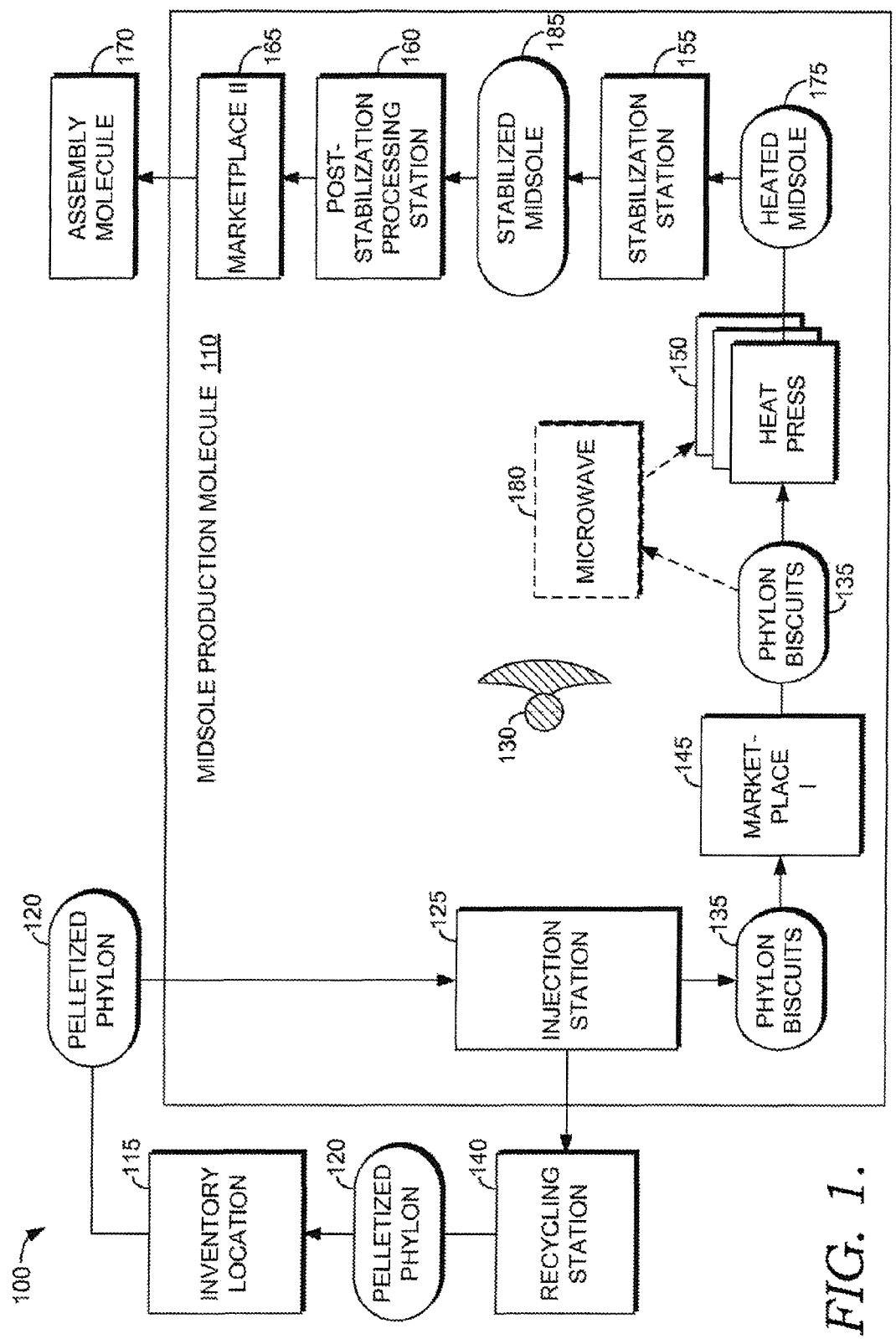
FIG. 1 is a block diagram of an exemplary modularized manufacturing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the invention may be described in the general context of a modularized manufacturing environment for generating an article of footwear from basic, unprocessed materials. In particular, the modularized manufacturing environment may be responsive to direct sales orders and enables the production of personalized footwear that meet the specifications of the orders. This environment may be flexible allowing for various customizations and/or models of a type of footwear (e.g., track-style versus cross-country-style running shoes), and is adaptable to produce various types of footwear (e.g., running shoes versus basketball shoes).

In one configuration, the modularized manufacturing environment may be adapted to execute a manufacturing process of single flow customization. This single flow manufacturing process employs a production model that includes micro-manufacturing building blocks referred to herein as molecules. The concept of "molecules" should not be construed as limiting and may encompass any portion of a manufacturing process or device that facilitates a piece of a manufacturing processes. It should be understood and appreciated that the designation of "molecules" is not meant to be limiting, and should be interpreted broadly to include one or a plurality of manufacturing tasks (e.g., fabrication and assembly) that may be performed by independent-functioning processing areas, as well as the devices and personnel that implement the manufacturing tasks designated to a particular molecule.

These separate molecules may be interconnected via a process flow. In one instance, several stages of the manufacturing process are performed within a molecule on a partially-complete footwear article. Upon, performing the last of these stages, the partially-completed footwear article is passed to another molecule as indicated by the production model created for that subject footwear article. In another instance, the last stage of a manufacturing process implemented at one molecule may encompass placing a partially-complete footwear article in a marketplace that feeds into another molecule. This marketplace may include a temporary storage area that holds a plurality of partially-complete footwear articles (e.g., various styles, types, and sizes of shoes) such that they are easily accessible by an operator of the other molecule. Upon removing a partially-complete footwear article from the marketplace, this exemplary temporary storage area may indicate to an operator at the initial molecule to perform a manufacturing process that fills the particular void of the temporary storage area. That is, the marketplace may function as a signaling system to trigger actions (e.g., production or supply of a unit) at the molecules that feed thereto.

Accordingly, the marketplace is an effective tool to accomplish the following goals of the modularized manufacturing environment: maintaining optimized, but lean, inventory levels; providing a signal to replenish (i.e., produce and deliver) a new partially-complete footwear article as a similar article is consumed. Further, the interaction between the molecules reflects a pull system that determines the supply, or production, according to the actual demand of the direct sales orders. Further yet, the manufacturing processes implemented at the various molecules may be performed concurrently, thereby continuously filling and drawing from the marketplaces.

In embodiments, these molecules may be quickly updated to perform various manufacturing processes according to the production model of a particular footwear article. By updating the molecules individually and concurrently, greater flexibility may be achieved by the modularized manufacturing environment, as opposed to a conventional manufacturing system. In addition, molecules may be added or reduced based on the production model of a particular footwear article. For instance, for a complex footwear article, one or more molecules may be incorporated into the modularized manufacturing environment, typically linked to one or more of the established marketplaces. Accordingly, the modularized manufacturing environment is scalable based, in part, on the type of footwear article to be produced, and/or the rate of production desired.

In a particular exemplary utilization of molecules in a manufacturing process, a running-shoe construction process may divided in to various molecules that are assigned individual or shared operations related to fabrication and assembly of the running shoe, in accordance with the production model of the running shoe. By way of example, one molecule may be individually responsible for cutting and printing a design on a section of synthetic leather, while sharing the responsibility of assembling an upper portion of the running shoe with another module. In another example, one molecule may be responsible for manufacturing portion(s) of the running shoe from raw grey goods, such as pelletized rubber for outsoles or phylon for midsoles.

Although various embodiments for practicing the invention with the modularized manufacturing environment, which comprises interlinked molecules, have been described, it should be understood and appreciated by those of ordinary skill in the art that other types of suitable production designs for implementing manufacturing processes may be used, and that the embodiments of the invention are not limited to those configurations described herein. Further, the present invention considers utilizing any number of molecules to produce a footwear article, or any other good, and should not be construed as limited to the production of shoes.

One particular module, of the modularized manufacturing environment, may be allocated for implement a manufacturing process that generates an midsole. Generally, a sole comprises the bottom of a shoe. The sole may be made up of a midsole and an outsole. The outsole is the layer in direct contact with the ground and may comprise a single piece, or may comprise separate pieces, of material (e.g., dress shoes often have leather outsoles while casual or sports-oriented shoes have outsoles made of natural rubber or a synthetic imitations thereof). In contrast, the midsole comprises an interior bottom of a shoe, which sits directly beneath the foot of a user.

Advantageously, the midsole often functions as a shock absorbing element in a shoe. Generally, the midsole is constructed from a single material that is selected according to the type of activity for which a particular article of footwear is designed. But, in specialty cases, like running shoes, various levels of shock absorption may be desirable to effectuate optimum performance from the shoe, as well as the athlete using the shoe. Conventionally, various levels of shock absorption are achieved by arranging and fixing separate midsoles, of various materials designed for a certain level of shock absorption, within the interior of the shoe. For instance, a firm midsole may be added beneath the heel, where a user applies a focused amount of downward pressure. Accordingly, this process requires various materials of differing density, a plurality of forms to create the many midsoles, and assembly processes that focus on attaching the many midsoles into a shoe, each at their appropriate location.

The systems and methods of the present invention produce a varying-degrees-of-firmness midsole that exhibits two of more levels of shock absorption, durability, and/or performance, based on which areas of the midsole are made firm or soft. For discussion purposes, the process of producing the midsole is divided into two separate procedures: generating the midsole in a heat press from "biscuits" of varying hardness, and stabilizing the midsole upon removal from the heat press. However, people familiar with the field of the invention will realize that manufacturing process related to producing the midsole may be practiced, and divided, by various stages/steps which are different from the specific illustrated procedures. Therefore it is emphasized that the invention is not limited only to the two discrete procedures but is embraces a wide variety of discrete and combined procedures that comprises the midsole manufacturing process.

Initially, embodiments of the procedure for generating the midsole in a heat press from "biscuits" of varying hardness, and the midsole achieved thereby, will now be described with reference to the accompanying drawings. The drawings and the associated descriptions are provided to illustrate embodiments of the present invention and not to limit the scope thereof. Reference in the specification to an "embodiment" is intended to indicate that a particular feature, structure, or characteristic described in connection with the embodiment is included in at least an embodiment of the invention. Further, the appearance of the phrase "in one embodiment" in various places in the specification are not necessarily all referring to the same embodiment.

Referring to the drawings in general, and initially to FIG. 1 in particular, a modularized manufacturing environment 100 adapted to execute a manufacturing process of single flow customization is shown, in accordance with an embodiment of the present invention. As discussed above, the modularized manufacturing environment 100 may include any number of molecules and marketplaces that interlink the molecules. Because the focus of this discussion pertains to the procedure for expanding the phylon biscuits into a midsole, a midsole production molecule 110 is featured. The midsole production molecule 110 includes an injection station 125, marketplace I 145, one or more heat presses 150, a stabilization station 155, a post-stabilization processing station 160, and a marketplace II 165.

Generally, the injection station 125 is configured to generate phylon biscuits 135 from pelletized phylon 120. The pelletized phylon 120 (e.g., ethylene-vinyl acetate (EVA) foam pellets) may be stored in an inventory location 115, such as a storage bay. The inventory location 115 may be located within the boundaries of the midsole production molecule 110, removed from the midsole production molecule 110 but within the same facility, or at a remote facility. The inventory location 115 may be organized in such a way that the earliest pelletized phylon 120 stocked to the inventory location 115 may used before later-stocked pelletized phylon 120 (i.e., utilizing a first-in-first-out (FIFO) scheme). Retrieval of the pelletized phylon 120 from the inventory location 120 may based according to a particular time schedule, such as shelf-life of the pelletized phylon 120 or direct sales orders to be satisfied.

Upon conveyance from the inventory location 115 to the injection station 125, the pelletized phylon 120 is heated until molten, but not reaching the point where the foaming agent is activated. In one particular example, a threshold temperature is established (e.g., 100 degrees Celsius) to which the molten phylon is heated. This threshold temperature is typically set below a temperature at which a foaming agent, incorporated within the pelletized phylon 120, is activated. The molten phylon may be injected into one or more pre-forms, or molding cavities, via runners through an injection mold. This injection process is complete upon cooling the molten phylon within the pre-forms such that a plurality of phylon biscuits 135 are generated. The phylon biscuits 135 assume the general shape of the pre-forms and remain substantially hard and inflexible. Accordingly, the pre-forms precisely control the volume of molten phylon injected therein, and the size and shape of the generated phylon biscuits 135. Further, based on the configuration of the cavity of the pre-forms within the infection mold, the phylon biscuits 135 may be generated in a variety of shapes. By way of example only, the phylon biscuits 135 may be formed into a general shape of a marshmallow or may be formed into the complex shape of interlocking pieces.

Although two different shapes of the phylon biscuit 135 have been described, it should be understood and appreciated by those of ordinary skill in the art that other types of suitable shapes and sizes that may be placed within the heat press 150 may be used, and that embodiments of the present invention are not limited to those phylon biscuits 135 described herein. Further, based on the chemical structure of the pelletized phylon 120, the phylon biscuits 135 generated via the injection station 125 may assume a variety of colors and/or densities that relate to their level of firmness.

The finished phylon biscuits 135 are moved from the injection station 125 to the marketplace I 145 for temporary storage. The excess phylon that is captured and cooled in the runners of the injection mold, as well as any other overflow phylon, may be passed to a recycling station 140. Generally, the recycling station 140 is responsible for grinding this excess phylon into pelletized phylon 120 that may be stored in the inventory location 115 and reused at a later time. This process of reusing the excess phylon is made possible because the molten phylon is not heated above the threshold temperature, where the foaming agent is activated. Thus, the molten phylon is not expanded, or "blown," thereby maintaining the chemical properties of the phylon intact and allowing it to be reused. In this way, the recycling station 120, in tandem with the injection process of the injection station 125, reduces wasting phylon and the expenses associated therewith.

A selection of the phylon biscuits 135 may be extracted from the marketplace I 145 to be utilized for as the starting materials for forming the phylon article. In other embodiments, the pelletized phylon 120 may be moved from the inventory location 115 and held in the marketplace I 145. This pelletized phylon 120 may then be extracted to be utilized for as the starting materials for forming the phylon article, either individually or in tandem with the selection of the phylon biscuits 135. In an exemplary embodiment, the phylon biscuits 135 and/or the pelletized phylon 120 are advanced to a pre-heat process prior to placement into, and expansion within, the heat presses 150. In general, the pre-heat process serves to introduce heat internally to the phylon biscuits 135 and/or the pelletized phylon 120 such that a consistent expansion is achieved upon heating the preheated phylon biscuits with the heat presses 150. In other words, the pre-heat process generates heat at the inside of the phylon biscuits 135 and/or the pelletized phylon 120, while the heat presses 150 initially heat the surface of the phylon biscuits 135; thus, uniformly melting the phylon biscuits 135 and/or the pelletized phylon 120 via consistent activation of the foaming agent. Further, pre-heating one or more of the phylon biscuits 135 and/or the pelletized phylon 120 may offer the advantage of significantly reducing the time it takes to properly expand the phylon biscuits 135 and/or the pelletized phylon 120 with the heat presses 180.

In one instance, a microwave 180 is provided to introduce the heat internally to the phylon biscuits 135 and/or the pelletized phylon 120. The microwave 180, as is understood by those of ordinary skill in the relevant field, may be any device that can internally heat an object before or concurrently with heating its outside, such as, but not limited to a food-service microwave (e.g., Magic Chef model # MCB780W that operates at 1.2 kilowatts), an industrial/commercial microwave, an apparatus that is capable of introducing microwaves, or any other form of radiation, into an object, or an oven that heats the inside and outside of an object evenly.

In embodiments, the phylon biscuits 135 and/or the pelletized phylon 120 are heated in the microwave 180 until a threshold temperature at a core location is reached. In another embodiment, the pre-heat process includes introducing heat internally to the phylon biscuit 135 and/or the pelletized phylon 120 based on a time scale. By way of example only, the phylon biscuits 135 and/or the pelletized phylon 120— either individually or in any combination—may be pre-heated for 65 seconds on a high setting of the Magic Chef style of the microwave 180. However, it should be understood that any method for gauging the amount of heat introduced to the phylon biscuits and/or the pelletized phylon 120 during the pre-heat process may be used, and is contemplated by the present invention.

Upon, completion of the pre-heat process, the pre-heated phylon biscuits 135 and/or the pelletized phylon 120 are passed from the microwave 180 to one or more of the heat presses 150 for placement therein. The heat presses 150 are generally configured to integrate a plurality of the phylon biscuits 135 to form the midsole upon activation. In an exemplary embodiment, integrating includes, at least, raising the selected phylon biscuits 135 and/or the pelletized phylon 120 above a threshold temperature. This threshold temperature of the heat press 150 is greater than the threshold temperature of the injection station 125. In one instance, the threshold temperature of the heat press 150 is established at a temperature high enough to activate the foaming agent incorporated within the pylon biscuits 135 and/or the pelletized phylon 120. By way of example only, the phylon biscuits 135 and/or the pelletized phylon 120 are heated to a threshold temperature set at 160-172 degrees Celsius for a duration of 8-13 minutes. This heat initiates the blowing process that causes the phylon biscuits 135 and/or the pelletized phylon 120 to expand to generally twice the size that they were received. In another instance, a target expansion rate may be 160%. In exemplary embodiments, the phylon biscuits 135 and/or the pelletized phylon 120 are blown at similar expansion rates regardless of their individual density or level of firmness.

As discussed above, the foaming agent incorporated into the phylon biscuits 135 and/or the pelletized phylon 120 is responsible for invoking the expansion thereof. The foaming agent is incorporated into the phylon as an ingredient when received in pellet form. Although conventionally referred to in several different manners, such as blowing agent, the ingredient incorporated into the phylon that assists, or is responsible for, causing expansion upon heat activation is referred to herein as the foaming agent.

The foaming agent may be any substance which alone or in combination with other substances is capable of producing a cellular structure in a plastic. Foaming agents may include compressed gases that expand when pressure is released, soluble solids that leave pores when leached out, liquids that develop cells when they change to gases, and chemical agents that decompose or react under the influence of heat to form a gas. By way of example, chemical foaming agents range from simple salts, such as ammonium or sodium bicarbonate, to complex nitrogen releasing agents. In operation, once the heat press 150 arrives at the activation temperature of the foaming agent, a polymer chain of the phylon biscuits 135 begins to break down causing the phylon to attain elastomeric properties such as softness and flexibility. Accordingly, the phylon, once cooled assumes shock absorption characteristics.

In addition, the process of integrating includes, at least, causing the heated phylon biscuits 135 to expand such that each of the phylon biscuits 135 couples with another of the phylon biscuits 135. Or, in other embodiments, the process of integrating includes causing the heated phylon biscuits 135 and the pelletized phylon 120 to expand such that each of the phylon biscuits 135 couples with individual particles of the pelletized phylon 120. In still other embodiments, the process of integrating includes causing the heated pelletized phylon 120 to expand such that each of the individual particles of the pelletized phylon 120 couples with each other. Accordingly, the heat press 150 melds the phylon biscuits 135 and/or the pelletized phylon 120 together to form a flexible heated midsole 175. However, persons familiar with the field of the invention will realize that the heat press 150 may be implemented to generate other flexible phylon articles which are different from the specific illustrated embodiment. Therefore, it is emphasized that the invention is not limited only to midsoles, but is embracing of a wide variety of components which fall within the spirit of the following claims.

In an exemplary embodiment, melding the phylon biscuits 135 and/or the pelletized phylon 120 together to form the heated midsole 175, includes melting the phylon biscuits 135 and/or the pelletized phylon 120 to a viscous material (e.g., a tacky liquid), and maintaining the temperature of the viscous phylon biscuits 135 and/or the pelletized phylon 120 such that they fuse together and cross link to form boundaries. That is, the viscous phylon biscuits 135 and/or the pelletized phylon 120 are heated such that they flow to the extend where each interferes with another or a wall of a mold cavity of the heat press 150. Accordingly, although the phylon biscuits 135 and/or the pelletized phylon 120 are expanded and interlink to form the heated midsole 175, there remains a defined separation of the phylon biscuits 135 or the compartmentalization of the pelletized phylon 120. This defined separation is visibly apparent when the colors of the phylon biscuits 135 are varied.

Because, the phylon biscuits 135 and/or the pelletized phylon 120, when heated in the heat press 150, are joined by a boundary, thereby remaining substantially separate, the resultant heated midsole 175 will exhibit the properties of each of the phylon biscuits 135 and/or the pelletized phylon 120 at a region in which they were located (e.g., placed within the molding cavity of the heat press 150). For instance, the heated midsole 175 may exhibit two or more degrees of firmness at distributed regions of the midsole associated with placement locations and characteristics (e.g., density) of the phylon biscuits 135 within a bed of the pelletized phylon 120. In embodiments, the placement locations may be based upon customer specifications embodied in a direct sales order. The customer specifications may target particular regions of the midsole for higher or lower firmness depending on desired performance characteristics of the shoe, biomechanics attributes of the customer, and the like. These features related to targeting regions within the midsole for higher or lower levels of firmness are discussed more fully below.

Figure 2:
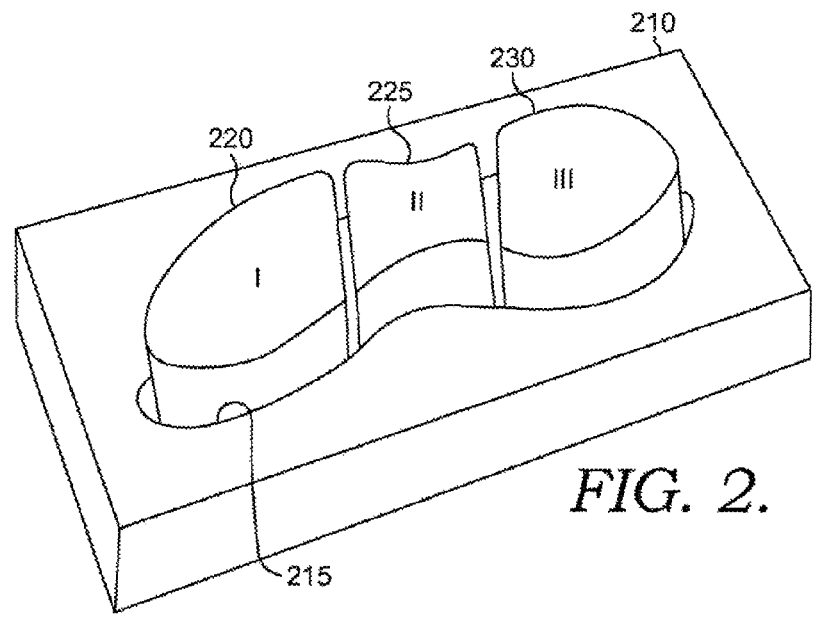
FIG. 2 is a perspective drawing that illustrates an exemplary component of the heat press with a selection of phylon biscuits placed therein, in accordance with embodiments of the present invention.

With reference to FIG. 2, an exemplary component 210 of the heat press 150 (see FIG. 1) is depicted with a selection of phylon biscuits 220, 225, and 230 placed therein, in accordance with embodiments of the present invention. It should be understood that the phylon biscuit I 220 may include properties that are distinct from the phylon biscuit II 225 and the phylon biscuit III 230. These properties may include color, density (resulting in a specific level of firmness once expanded to form the midsole), shape, size, etc. In this particular example, as illustrated, the phylon biscuit I 220 comprises a comparatively high density, the pylon biscuit II 225 comprises a comparatively low density, while the pylon biscuit III 230 comprises an average density. Further, as illustrated, the phylon biscuits 220, 225, and 230 are placed within a molding cavity 215 of the exemplary component 210 of the heat press. However, one of ordinary skill in the art will realized that the phylon biscuits 220, 225, and 230 may be placed in any receiving area of the heat press and in any arrangement.

Figure 3:
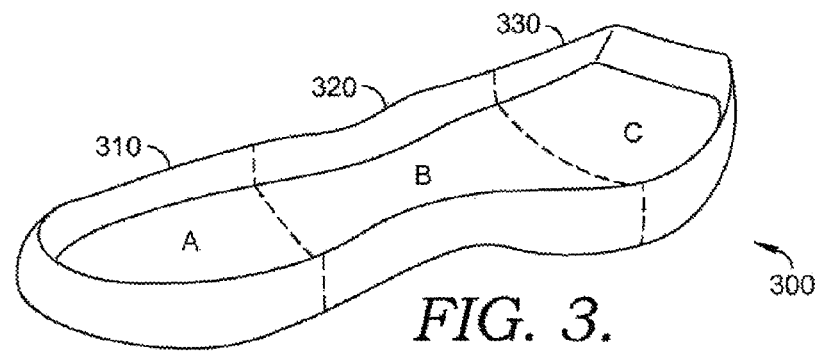
FIG. 3 is a perspective drawing that illustrates an exemplary midsole that includes a plurality of regions therein, in accordance with an embodiment of the present invention.
Figure 4:
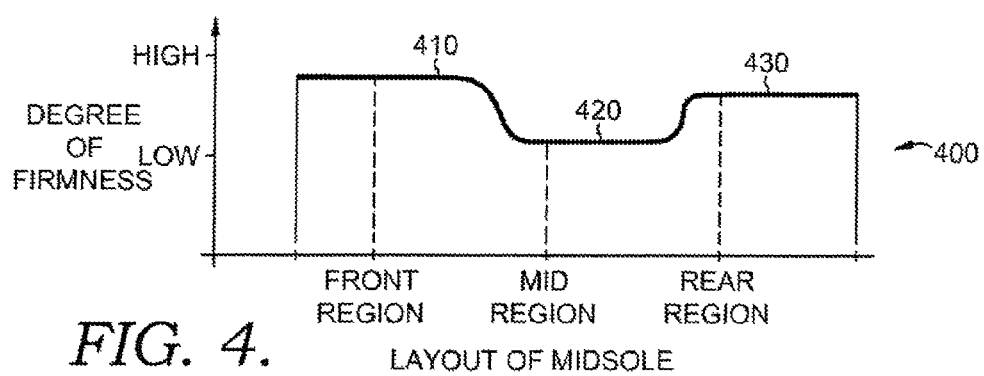
FIG. 4 is a graphical depiction of longitudinally varying firmness of a midsole indicating a degree of firmness over a layout of the midsole, in accordance with embodiments of the present invention.

Once expanded in the heat press, the phylon biscuits 220, 225, and 230 expand and fuse, or permanently couple, together to form the regions 310, 320, and 330, respectively, of midsole 300 as illustrated in FIG. 3. With continued reference to FIG. 3, the region A 310, the region B 320, and the region C 330 are fused together at boundaries (dashed lines) and are sufficiently separate so that the properties inherent to the biscuits 220, 225, and 230 are distinctly expressed by the regions 310, 320, and 330, respectively. Accordingly, as shown in FIG. 4, these properties are plotted in a line graph 400. In particular, the plot indicates a degree of firmness that follows a longitudinal layout of the midsole 300. As can be seen, the front region of the midsole 300, associated with the region A 310 of FIG. 3, has a high degree of firmness 410, corresponding to the comparatively high density of the pylon biscuit I 220 of FIG. 2. In contrast, the mid region of the midsole 300, associated with the region B 320 of FIG. 3, has a low degree of firmness 420, corresponding to the comparatively low density of the pylon biscuit II 230 of FIG. 2. Further, the rear region of the midsole 300, associated with the region C 330 of FIG. 3, has an medium degree of firmness 430, corresponding to the average density of the pylon biscuit III 240 of FIG. 2. It should be understood that density of the phylon biscuits 220, 225, and 230 may not be the leading factor that drives the resultant firmness of the midsole 300. By way of example, chemical composition or other attributes of the phylon biscuits 220, 225, and 230 may be determinant when generating varying levels of firmness of the midsole 300.

Although the characteristic of density of the phylon biscuits 220, 225, and 230, and how it is reflected in the regions 310, 320, and 330 is one focus of discussion, other characteristics may be found in the phylon biscuits 220, 225, and 230 and reflected in the regions 310, 320, and 330 upon expansion in the heat press. For instance, the phylon biscuits 220, 225, and 230 may each have a different color associated therewith, that upon arrangement within the molding cavity of the heat press, are reflected in the regions 310, 320, and 330 as a pattern that generally corresponds to the arrangement. In this instance, the density of the phylon biscuits 220, 225, and 230 may be substantively equivalent or varied, based on a design of the midsole 300 and/or direct sales order from a customer. Even further, other characteristics of the phylon biscuits 220, 225, and 230 may be reflected in the regions 310, 320, and 330 that influence the aesthetics and/or functionality of the midsole 300, and one of ordinary skill in the art will realize that each these characteristics are contemplated by the present invention.

Figure 5:
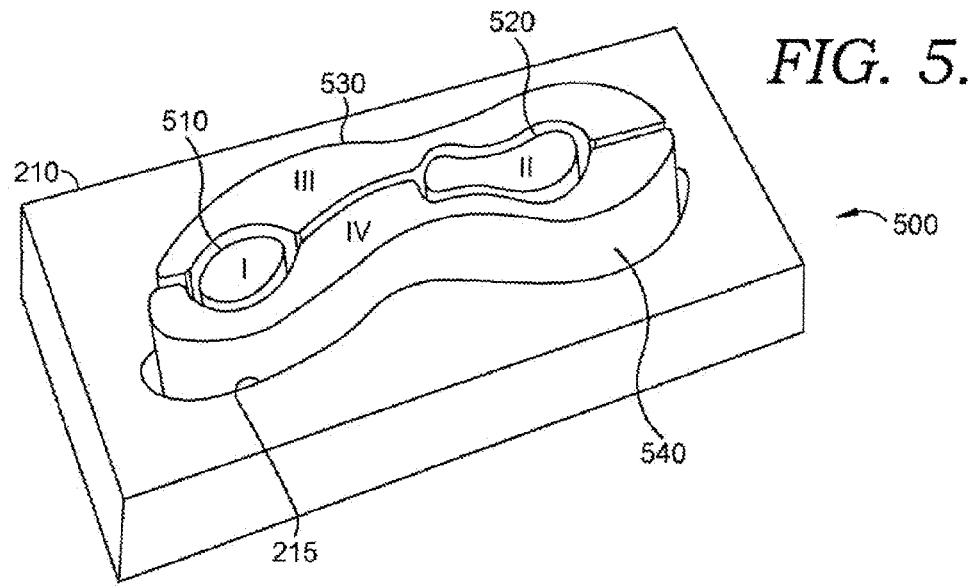
FIG. 5 is a perspective drawing that illustrates an exemplary component of the heat press with a selection of phylon biscuits placed therein, in accordance with embodiments of the present invention.

Turning now to FIG. 5, a perspective drawing that illustrates an exemplary component 210 of a heat press operation 500 with a selection of phylon biscuits 510, 520, 530, and 540 placed therein, in accordance with embodiments of the present invention. As discussed above, the phylon biscuits 510, 520, 530, and 540 may be placed in a receiving area, or the molding cavity 215, of the exemplary component 210. Further, placing may include selecting and arranging the phylon biscuits 510, 520, 530, and 540 in accordance with a pattern. In on instance, arranging the phylon biscuits 510, 520, 530, and 540 in the molding cavity 215 includes organizing the phylon biscuit I 510 at the toe of the midsole and the phylon biscuit II at the heel of the midsole, according to the pattern. In an exemplary embodiment, the pattern is based on the customer specifications. For instance, the customer specifications may be based on a direct sales order that depicts physiological characteristics of the customer (e.g., severe supination problems). In other embodiments, the pattern is based on a specification driven by requirements of the single piece flow, by a demand for a certain midsole from a marketplace, by another mechanism that triggers the production of a midsole, or by any other work flow model that drives the manufacture of particular footwear within the molecule.

Figure 6:
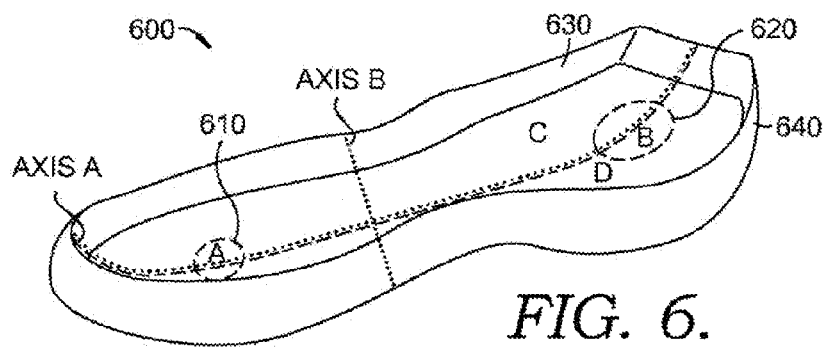
FIG. 6 is a perspective drawing that illustrates an exemplary midsole that includes a plurality of regions therein, in accordance with an embodiment of the present invention.
Figure 7:
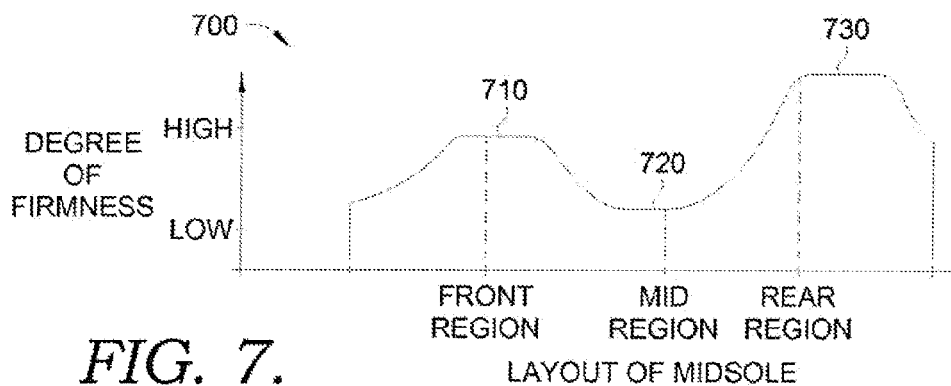
FIG. 7 is a graphical depiction of longitudinally varying firmness of a midsole indicating a degree of firmness over Axis A (see FIG. 6) of the midsole, in accordance with embodiments of the present invention.

As shown in FIG. 6, a perspective drawing illustrating an exemplary midsole 600 that includes a plurality of regions 610, 620, 630, and 640 therein is provided in accordance with an embodiment of the present invention. Each of the regions 610, 620, 630, and 640 maps to one of the phylon biscuits 510, 520, 530, and 540, respectively, arranged in the molding cavity 215 (see FIG. 5). Moreover, a degree of firmness exhibited by each of the regions 610, 620, 630, and 640 is reflective of a density inherent to each of the mapped phylon biscuits 510, 520, 530, and 540, respectively. In one instance, the toe, or ball of the foot, portion of the midsole 600 may be associated with the region A 610. The region A 610 may have a high degree of firmness 710 (see FIG. 7) because the phylon biscuit I 510 of FIG. 5 has a comparatively higher density. In use, the region A 610 of the midsole 600 may provide greater support to a user and/or enhanced durability at that high-wear toe portion of the midsole 600. Similarly, the heel portion of the midsole 600 may be associated with the region B 620. The region B 620 may have a high degree of firmness 730 (see FIG. 7) because the phylon biscuit II 520 of FIG. 5 has a comparatively higher density. Again, the high degree of firmness provides greater support and may be precisely located on the midsole 600 based on a customer's specifications.

Figure 8:
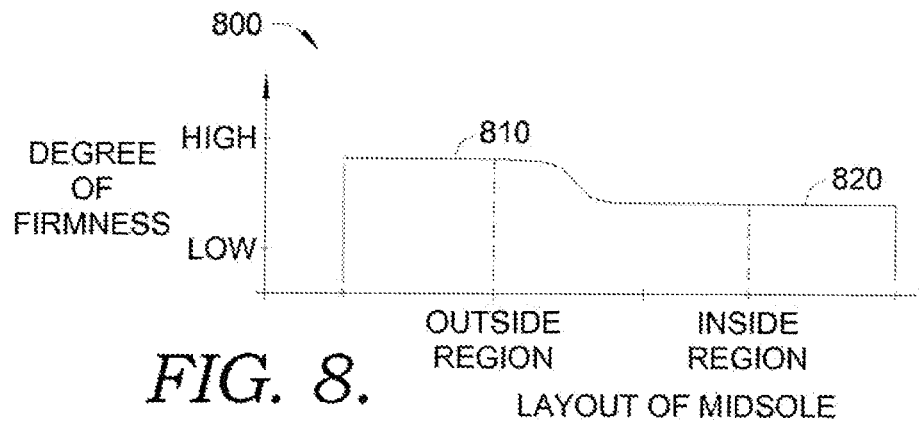
FIG. 8 is a graphical depiction of laterally varying firmness of a midsole indicating a degree of firmness over Axis B (see FIG. 6) of the midsole, in accordance with embodiments of the present invention.

The regions 630 and 640 will now be discussed. Based on the specification of the customer, the regions 630 and 640 may have a higher degree of firmness than the regions 610 and 620. As illustrated, the regions 630 and 640 have a lower degree of firmness 720 (see FIG. 7) because the phylon biscuit III 530 and the phylon biscuit IV 540 of FIG. 5, which expand to form the region C 630 and the region D 640, respectively, have a comparatively lower density. In one embodiment, the phylon biscuit III 530 of FIG. 5 that expands to form the region C 630 has a higher density than the phylon biscuit IV 540 of FIG. 5 that expands to form the region D 640. Accordingly, with reference to FIGS. 6 and 8, the region C 630 (outside region) has a comparatively higher degree of firmness 810 while the region D 640 (inside region) has a comparatively lower degree of firmness 820. By varying the hardness laterally across the foot, the design of the pattern can address issues of over pronation. In another embodiment, the regions 630 and 640 have similar degrees of firmness to provide consistent support for a user's arch.

Although various different patterns of phylon biscuits have been described, it should be understood and appreciated by those of ordinary skill in the art that other types of suitable patterns that result in various firmness topographies of the midsole may be used, and that embodiments of the present invention are not limited to those patterns described herein. For instance, the larger complex phylon biscuits may be pre-formed into repetitive common shapes that are arranged to achieve a similar pattern as illustrated in FIGS. 2 and 5. In another instance, the phylon biscuits may be formed to interlock such they may be inserted as a single unit into the receiving area of the heat press. Further, besides governing the locations and density of the phylon biscuits, the pattern may arrange the biscuits such that a color design is formed on the midsole for aesthetic or stylistic purposes. Advantageously, the ability to create a pattern of varying biscuits that is reflected in the regions of a midsole offers customization of both performance (e.g., localized the areas of extra hardness) and color options.

Figure 9:
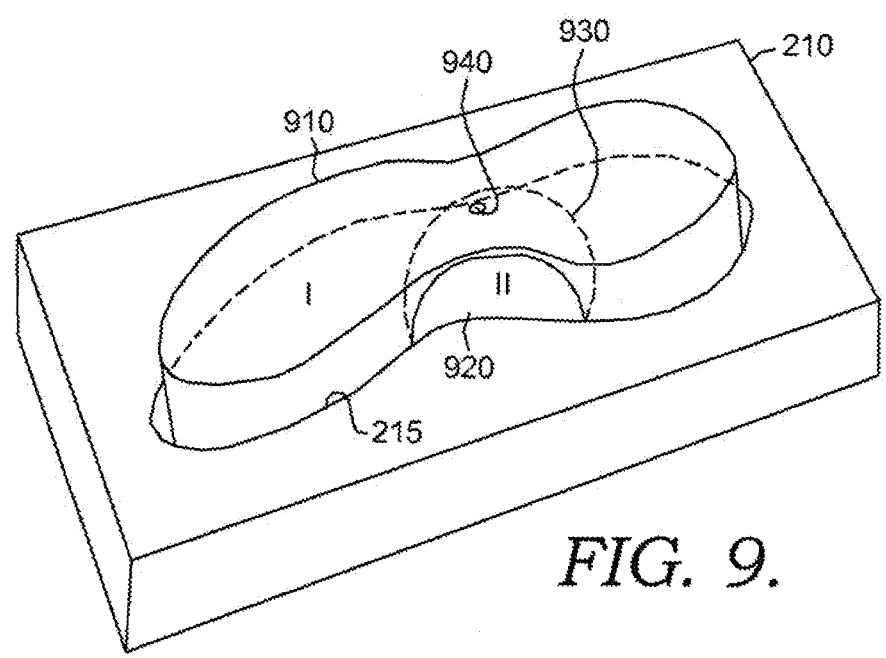
FIG. 9 is a perspective drawing that illustrates an exemplary component of the heat press with a selection of phylon biscuits placed therein, in accordance with embodiments of the present invention.

With reference to FIG. 9, a perspective drawing that illustrates an exemplary component 210 of the heat press with a selection of phylon biscuits placed therein is shown, in accordance with embodiments of the present invention. In the embodiment illustrated, a phylon biscuit I 910 is inserted into the molding cavity 215 and includes cutaway therein 930, this cutaway 930 is adapted to hold another phylon biscuit II 920. Accordingly, a layering of the phylon biscuits 910 and 920 is provided. Further, the cutaway of the phylon biscuit I 910 serves, in part, to fix the phylon biscuit II 920 in position when expanding in the heat press. A hole 940 may be provided in the phylon biscuit I 910, but is not necessary.

Figure 10:
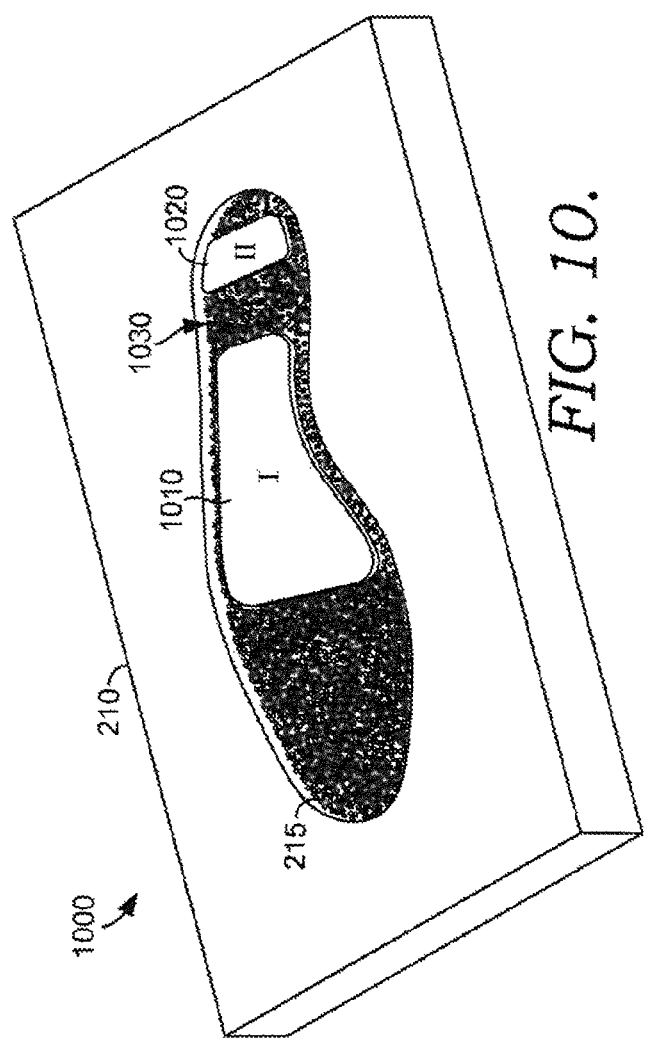
FIG. 10 is a perspective drawing that illustrates an exemplary component of the heat press with a selection of phylon biscuits placed on a bed of pelletized phylon residing therein, in accordance with embodiments of the present invention.

With reference to FIG. 10, an exemplary component 210 of the heat press 150 (see FIG. 1) is depicted with a selection of phylon biscuits 1010 and 1020 placed therein, in accordance with embodiments of the present invention. Further a quantity of pelletized phylon 1030 (e.g. using the pelletized phylon 120 of FIG. 1) is inserted within the molding cavity 215 of the component 210. It should be understood that the phylon biscuit I 1010 may include properties that are distinct from the phylon biscuit II 1020 and the pelletized phylon 1030. These properties may include color, density (resulting in a specific level of firmness once expanded to form the midsole), shape, size, etc. In this particular example, as illustrated, the phylon biscuit I 1010 and the phylon biscuit II 1020 both comprise a comparatively high density that provides a wearer of the resultant phylon product enhanced arch and heel support, respectively. Accordingly, the pelletized phylon 1030 might comprise a comparatively low density to cushion a balance of the wearer's foot. Further, as illustrated, the phylon biscuits 1010 and 1020 may be placed into a bed of the pelletized phylon 1030, or placed prior to the pelletized phylon 1030 being poured into the molding cavity 215. In the latter instance, pelletized phylon 1030 may be poured in such a fashion as to fill any voids that appear between walls of the molding cavity 215 and the phylon biscuits 1010 and 1020. However, one of ordinary skill in the art will realized that any number of phylon biscuits in combination with any quantity of the pelletized phylon 1030 may be placed in the receiving area of the heat press and in any arrangement.

Figure 11:
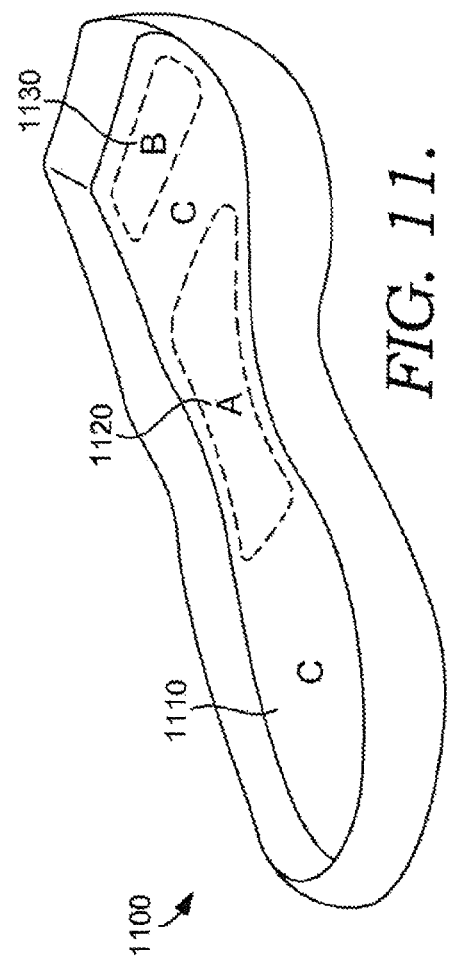
FIG. 11 is a perspective drawing that illustrates an exemplary midsole that includes a plurality of regions therein, in accordance with an embodiment of the present invention.

Once expanded in the heat press, the phylon biscuits 1010 and 1020, together with the pelletized phylon 1030, expand and fuse, or permanently couple, together to form defined regions of a resultant phylon product. Turning now to FIG. 11, the result phylon article is configured as a midsole 1100 with defined regions 1110, 1120, and 1130 that correspond with the pelletized phylon 1030, and the phylon biscuits 1010 and 1020 of FIG. 10, respectively. With continued reference to FIG. 11, the region A 1120, the region B 1130, and the region C 1110 are fused together at boundaries (dashed lines) and are sufficiently separate so that the properties inherent to the phylon biscuits 1010 and 1020, as well as the pelletized phylon 1030, are distinctly expressed by the regions 1120, 1130, and 1110, respectively. Accordingly, as discussed above, the phylon biscuits 1010 and 1020 of FIG. 10 may be more dense than the pelletized phylon 1030, which translates into a higher hardness at the region A 1020 and the region B 1030 in comparison to the region C 1110. In application, the midsole 1100 will provide a wearer with greater arch and heel support.

Although providing heel and arch support are discussed extensively hereinabove, it should be noted that the phylon biscuits 1010 and 1020 of FIG. 10 may be located in any arrangement within a receiving area to provide increased or decreased hardness at targeted areas of the midsole 1100. These locations of the phylon biscuits 1010 and 1020 may be determined by a designer of a particular article of footwear (e.g., running shoe), or may be selected indirectly by a customer of the article of footwear. In the latter instance, a customer may be provided with a tool to input specifications related to hardness and/or color scheme of an article of footwear in order to customize the resultant product to her preferences or physical attributes. Upon receiving the customer's specifications, the phylon biscuit(s) may be selected for color and density, as well as located within the pelletized phylon 1030 of FIG. 10, based upon the specifications. These selected phylon biscuit(s), when fused with the pelletized phylon during expansion in the heat press, create a resultant product that reflects the proper colors and levels of hardness that satisfy the customer's specifications. Accordingly, this process of customer customization allows a customer to indirectly influence the selection and location of the phylon biscuit(s) and pelletized phylon, while directly influencing the aesthetics and/or functionality of a midsole.

Figure 12:
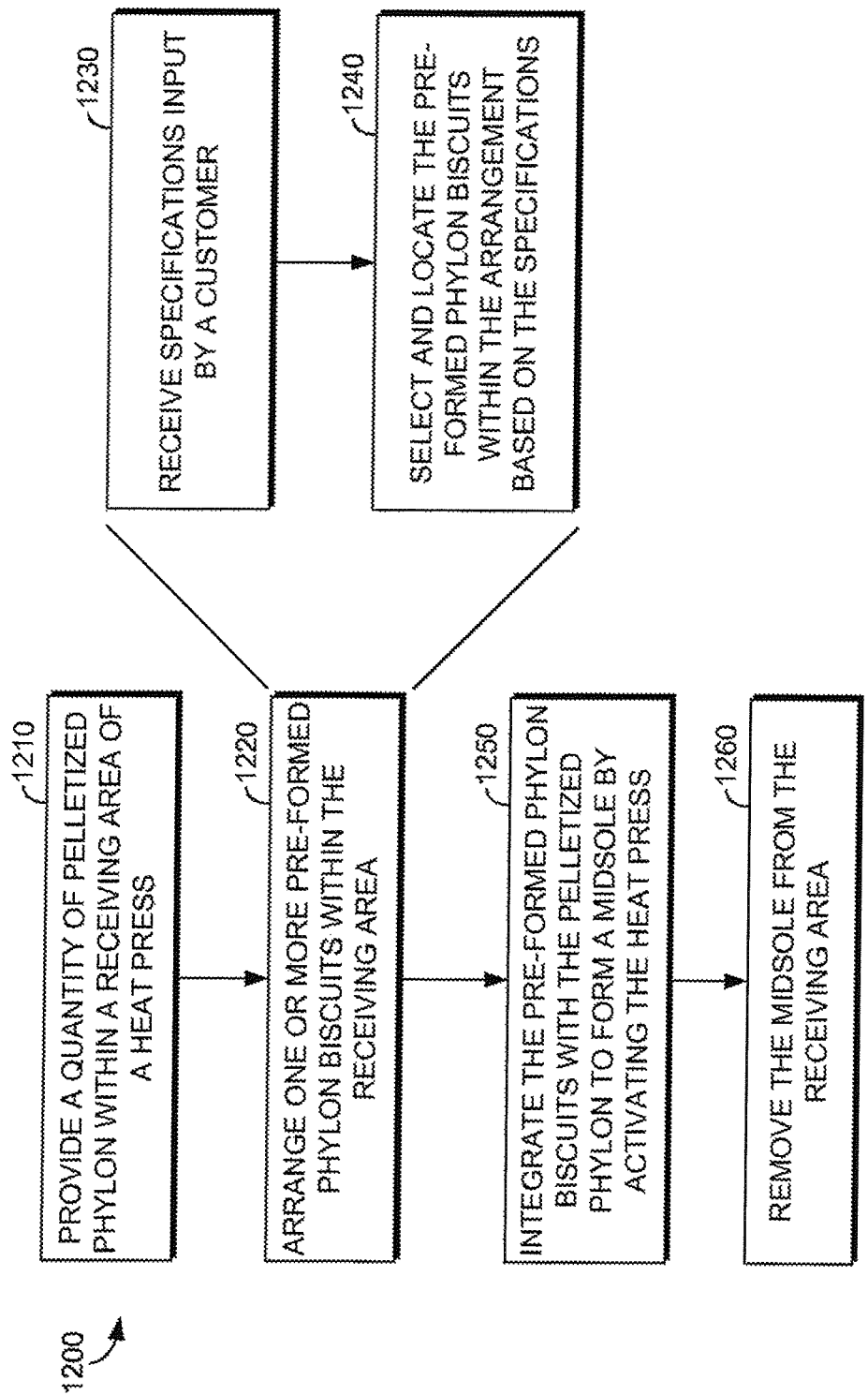
FIG. 12 illustrates a flow diagram showing an overall method for integrating a plurality of pre-formed phylon biscuits together with a quantity of pelletized phylon, in accordance with embodiments of the present invention.

With reference to FIG. 12, a flow diagram is illustrated that shows an overall method 1200 for integrating a plurality of pre-formed phylon biscuits together with pelletized phylon, in accordance with embodiments of the present invention. Although the terms "step" and "block" are used hereinbelow to connote different elements of methods employed, the terms should not be interpreted as implying any particular order among or between various steps herein disclosed unless and except when the order of individual steps is explicitly described.

Initially, as depicted at block 1210, a quantity of pelletized phylon is provided within a receiving area of a heat press. Next, or prior to placing the pelletized phylon in the receiving area, one or more pre-formed phylon biscuits is arranged within the receiving area, as depicted at block 1220. In embodiments, the process of arranging the phylon biscuits includes receiving specifications from a customer (see block 1230), selecting one or more pre-formed phylon biscuits with a particular level of density, color, size, geometry, shape, and/or other properties that contribute to the functionality and aesthetics of a resultant product based on the specifications, and locating the selected pre-formed phylon biscuits within the arrangement based on the specifications (see block 1240). As depicted at block 1250, the selected and arranged pre-formed phylon biscuits are integrated together with the pelletized phylon to form the resultant product. By way of example, the resultant product may be a midsole for assembly with other components to create an article of footwear. As depicted at block 1260, the midsole may be removed from the receiving area for storage or for further processing, such as stabilization.

Figure 13:
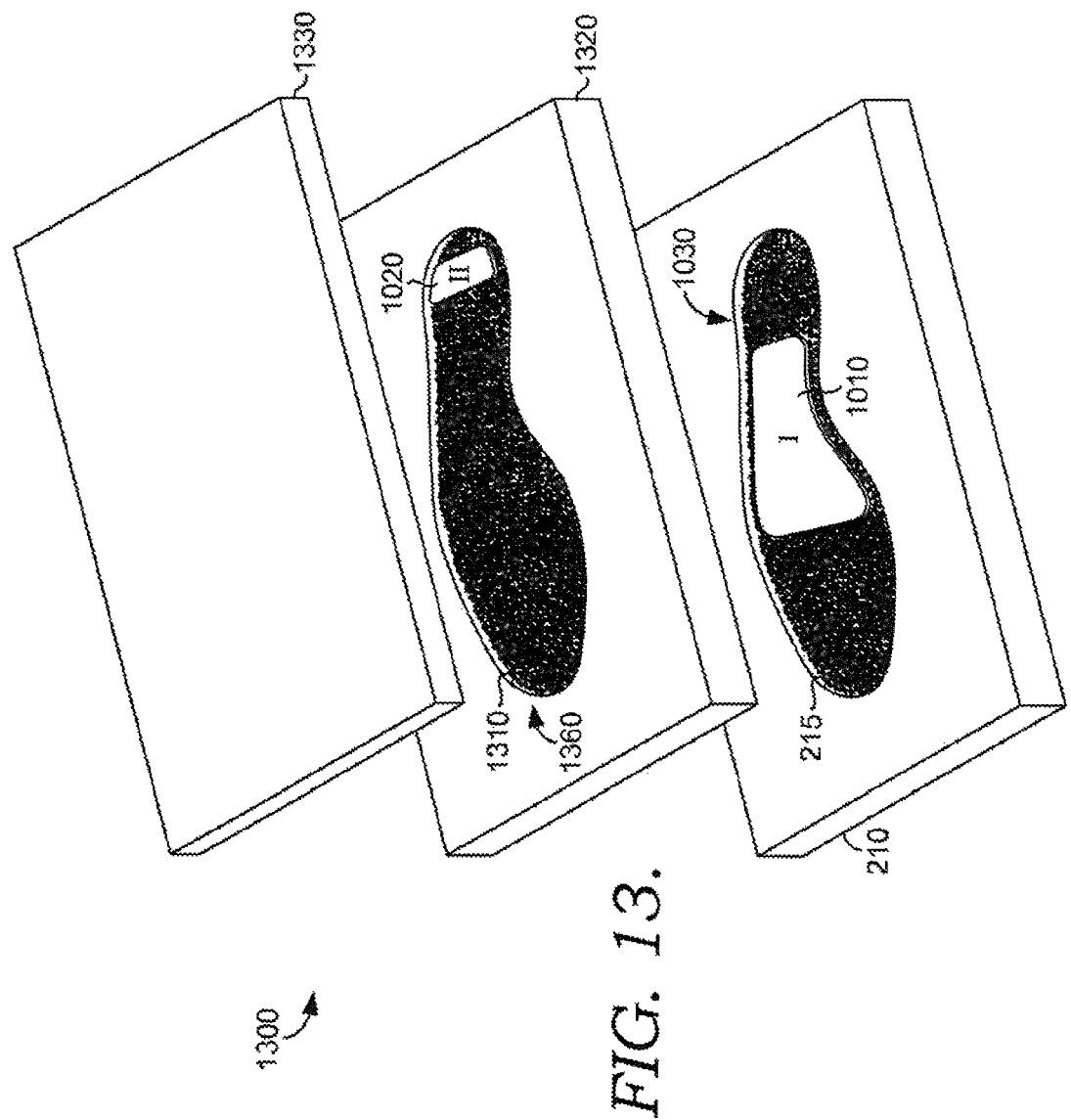
FIG. 13 is a perspective drawing that illustrates exemplary components of the heat press with a selection of phylon biscuits placed on beds of pelletized phylon residing therein, in accordance with embodiments of the present invention.

With reference to FIG. 13, exemplary components 210, 1320, and 1330 of the heat press 150 (see FIG. 1) are depicted with a selection of phylon biscuits 1010 and 1020 placed therein, in accordance with embodiments of the present invention. Further, quantities of pelletized phylon 1030 and 1360 are inserted within the molding cavities 215 and 1310 of the components 210 and 1320, respectively. It should be understood that the phylon biscuit I 1010 may include properties that are distinct from the phylon biscuit II 1020, the pelletized phylon 1030, and the pelletized phylon 1360. These properties may include color, density (resulting in a specific level of firmness once expanded to form the midsole), shape, size, etc. Similar to the embodiment discussed with reference to FIGS. 10 and 11, the phylon biscuit I 1010 is located in an arch position of a midsole, while the phylon biscuit II 1020 is located in a heel position of a midsole. These locations may be based on customer specifications or a design preferences related to performance of an article of footwear. However, in contrast to the configuration described above, the phylon biscuit I 1010 is placed, in combination with the pelletized phylon 1030 in the molding cavity 215 of the component 210 (lower plate), while the phylon biscuit II 1020 is placed, in combination with the pelletized phylon 1360 in the molding cavity 1310 of the component 1320 (separator plate). The component 1330 serves as a top plate such that during a heat press operation the phylon biscuit I 1010 and the pelletized phylon 1030 are activated and fused within the molding cavity 215, which is enclosed by the component 210 (lower plate) and the component 1320 (separator plate), while the phylon biscuit II 1020 and the pelletized phylon 1360 are activated and fused in the molding cavity 1310, which is enclosed by the component 1320 (separator plate) and the component 1330 (top plate).

Figure 14:
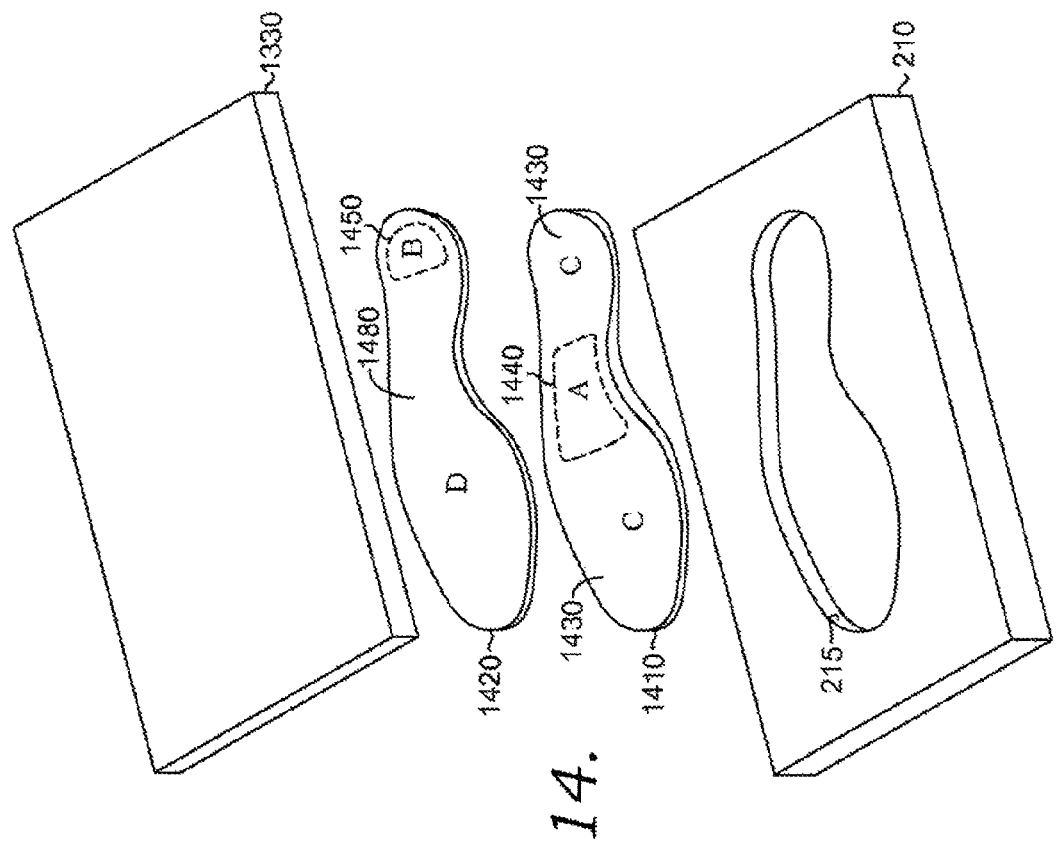
FIG. 14 is a perspective drawing that illustrates exemplary midsole sections that include a plurality of regions therein, in accordance with an embodiment of the present invention.

Once the heat press operation is partially accomplished, the components 210, 1320, and 1330 are released to expose midsole sections 1410 and 1420 of FIG. 14. In one embodiment, the heat press operation is partially accomplished when the phylon biscuits and/or pelletized phylon have started to activate and have expanded into one another, but have not completely integrated. By way of example, the partial accomplishment the heat press operation includes blowing the phylon biscuits and/or pelletized phylon for a predetermine timeframe (e.g., 45 seconds) and interrupting the operation to extract the midsole sections 1410 and 1420. As illustrated, the phylon biscuits 1010 and 1020 of FIG. 13, together with the pelletized phylon 1030 and 1360, expand and partially fuse together to form defined regions 1440, 1450, 1430, and 1480, respectively, of a resultant phylon product. (Boundary lines of the regions 1440, 1450, 1430, and 1480 are depicted as dashed lines).

The heat press operation is progressed by placing in contact, or stacking, the midsole sections 1410 and 1420. These stacked midsole sections 1410 and 1420 are placed into the heat press with the component 1320 (separator plate) removed. That is, the stacked midsole sections 1410 and 1420 are placed into the molding cavity 215, which is enclosed by the components 210 (lower plate) and 1330 (top plate). Upon containing the stacked midsole sections 1410 and 1420, the heat press operation is resumed until the phylon is fully blown (i.e., when the phylon biscuits 1010 and 1020 of FIG. 13, together with the pelletized phylon 1030 and 1360, are expanded and completely fused).

Figure 15:
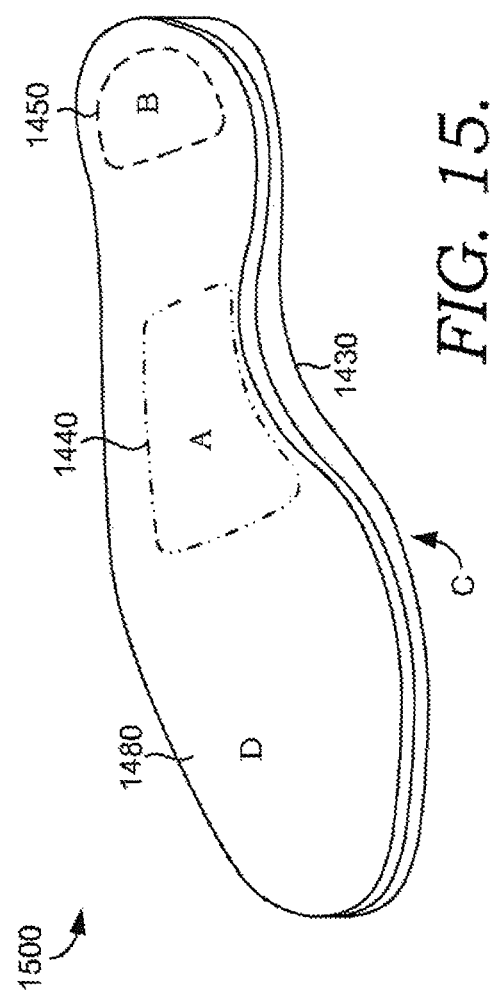
FIG. 15 is a perspective drawing that illustrates an exemplary midsole comprised of midsole sections that include a plurality of regions therein, in accordance with an embodiment of the present invention.

Referring now to FIG. 15, a resultant product (midsole 1500) of the process described immediately above is illustrated. In other words, upon completion of the heat press operation, the stacked midsole sections 1410 and 1420 of FIG. 14 fuse to form the midsole 1500. Yet, although the stacked midsole sections 1410 and 1420 are now fused, the defined regions 1440, 1450, 1430, and 1480 remain separated (as indicated by the dashed lines of FIG. 15). In particular, the midsole 1500 includes an upper portion, which is a remnant of the midsole section 1420, and a lower portion, which is a remnant of the midsole section 1410. Further, the upper portion includes regions B 1450 (exhibiting characteristics imparted by the phylon biscuit II 1020) and D 1480 (exhibiting characteristics imparted by the pelletized phylon 1360). Meanwhile, the lower portion includes regions A 1440 (exhibiting characteristics imparted by the phylon biscuit I 1010) and C 1430 (exhibiting characteristics imparted by the pelletized phylon 1030). As such, this process of interrupting a heat press operation allows for not only locating colors, hardness, and other characteristics in an X and Y coordinate arrangement, but can locate those characteristics in a Z coordinate arrangement within the resultant product.

Figure 16:
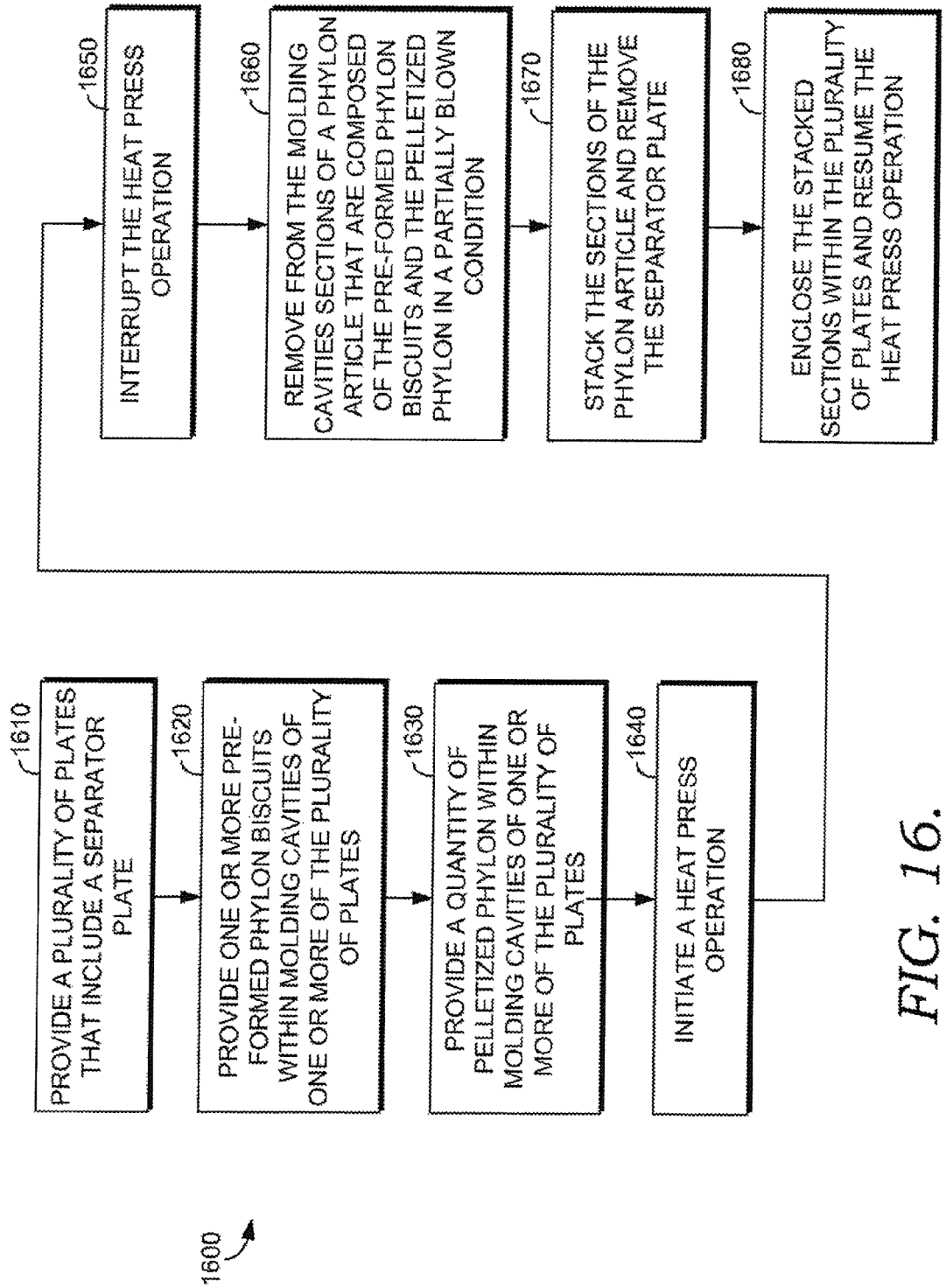
FIG. 16 illustrates a flow diagram showing an overall method for integrating a plurality of pre-formed phylon biscuits together with a quantity of pelletized phylon, in accordance with embodiments of the present invention.

With reference to FIG. 16, a flow diagram is illustrated that shows an overall method 1600 for integrating a plurality of pre-formed phylon biscuits together with pelletized phylon, in accordance with embodiments of the present invention. Initially, as depicted at block 1610, a plurality of plates is provided. In one instance, the plurality of plates includes a lower plate, a top plate, and a separator plate that is assembled between the lower plate and top plate during the heat press operation. Also, as depicted at block 1620, one or more pre-formed phylon biscuits are arranged within the molding cavities of one or more of the plurality of plates. As depicted at block 1630, a quantity of pelletized phylon is provided within the molding cavities of one or more of the plurality of plates. By way of example, the pre-formed phylon biscuits and the pelletized phylon are placed within the molding cavities of the lower plate and the separator plate.

Next, as depicted at block 1640, a heat press operation is initiated until partially accomplished. As depicted at block 1650, the heat press operation is interrupted. Upon interruption, sections of a phylon article are removed from the molding cavities. The sections are composed of the preformed phylon biscuits and the pelletized phylon in a partially blown condition. As depicted at block 1670, the removed sections of the phylon article are stacked. Also, at this stage in the fabrication of the phylon article, the separator plate is removed from the heat press. As depicted at block 1680, the stacked sections of the phylon article are placed within the plurality of plates (e.g., lower plate and top plate), and the heat press operation is resumed until complete. The resultant product of the heat press operation, in this embodiment, is a phylon article that is composed of the sections fused together in a fully blown condition.

Although the phylon articles being manufacture by the methods described herein include both pelletized phylon and one or more pre-formed phylon biscuits, the phylon articles may be made using only pelletized phylon or only pre-formed phylon biscuits. In the instance where only pelletized phylon is used in the heat press operation, dividers may be used to compartmentalized the pelletized phylon into zones, thereby creating regions within the phylon article that have characteristics that reflect properties of each of the zones, respectively. One example of the dividers is the separator plate 1320 of FIG. 13. Another example of the dividers are metal plates that are inserted into the molding cavity to form the zones therein. Pelletized phylon can then be poured into the zones during loading of the plates of the heat press. Accordingly, the zones are kept separate during the heat press operation such that characteristics of the pelletized phylon in each of the zones is expressed in the defined regions of the phylon article.

Figure 17:
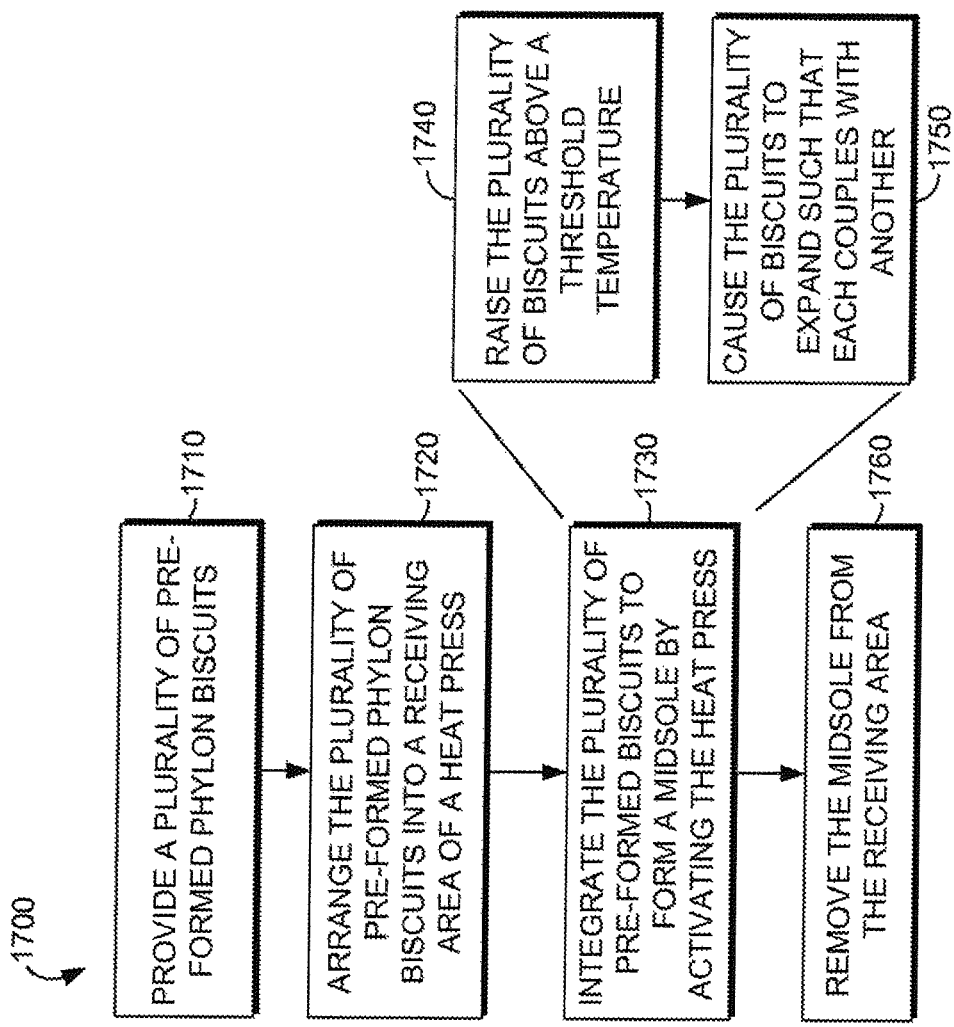
FIG. 17 illustrates a flow diagram showing an overall method for integrating a plurality of pre-formed biscuits, in accordance with embodiments of the present invention.

In the instance where only one or more pre-formed phylon biscuits are used in the heat press operation, the phylon biscuits may be fused according to the embodiment below. Referring to FIG. 17, a flow diagram is illustrated that shows an overall method 1700 for integrating a plurality of pre-formed phylon biscuits, in accordance with embodiments of the present invention. Initially, a plurality of pre-formed phylon biscuits (comparable to the phylon biscuits 135 of FIG. 1) are provided, as depicted at block 1710. In embodiments, these preformed phylon biscuits are generated by an injection process that feeds molten phylon into molding cavities of an injection mold (e.g., utilizing the injection station 125 of FIG. 1). As depicted at block 1720, the plurality of preformed phylon biscuits are arranged into a receiving area of a heat press (comparable to the heat press 150 of FIG. 1).

The plurality of pre-formed phylon biscuits may be integrated to form a midsole (e.g., exemplary midsole 300 and 600 of FIGS. 3 and 6, respectively) by activating the heat press, as depicted at block 1730. In embodiments, integrating may comprise raising the plurality of biscuits above a threshold temperature that activate a foaming agent in the phylon (see block 1740), and causing the plurality of biscuits to expand such that each couples, or fuses, with another, without substantial mixing (see block 1750). Upon expanding the phylon biscuits such that they are melded together and assume the shape of the molding cavity, a heated midsole is removed from the heat press, as indicated at block 1760.

As discussed above, methods of the present invention are employed to produce a varying-degrees-of-firmness midsole, wherein producing the midsole comprises generating the midsole in a heat press from "biscuits" of varying hardness, and stabilizing the midsole upon removal from the heat press. Accordingly, with reference to FIG. 1, the heated midsoles 175 are removed from the molding cavity of the heat press 150, and passed to the stabilization station 155. The stabilization station 155 may comprise an area that gradually lowers the temperature of the air around the midsole 160. For instance, the temperature of the air may be incrementally decreased over a period of time to ensure proper stabilization of the heat and expanded phylon. Bt way of example, and not limitation, the decrease of the air temperature over time may follow the following scheme: air at 75 degrees Celsius for 10 minutes, ramp down the temperature of air to 65 degrees Celsius for 6 or 7 minutes, hold the temperature of the air at 65 degrees Celsius for 10 minutes, ramp down the temperature of air to 55 degrees Celsius for 6 or 7 minutes, hold the temperature of the air at 55 degrees Celsius for 10 minutes, ramp down the temperature of air to 45 degrees Celsius for 6 or 7 minutes, and hold the temperature of the air at 65 degrees Celsius for 45 minutes. Although a single scheme of ramping down the air temperature, to which the midsole 160 is exposed, has been described, it should be understood and appreciated by those of ordinary skill in the art that other types of suitable air-stabilization schemes may be used, and that embodiments of the present invention are not limited to the scheme and/or temperatures described above.

The stabilized midsoles 160 are passed to a post-stabilization station 160 where various operations are performed on the midsoles 160 to prepare them for storage and assembly to the balance of an article of footwear. In embodiments, the various operations include at least one or more of the following: ultra-violet (UV) curing, secondary cleaning, and priming. Next, the midsoles are passed to the marketplace 165 for eventual distribution to other stations at other molecules. In an exemplary embodiment, the finished midsoles are removed from the marketplace II 165 for continued processing at an assembly molecule of the modularized manufacturing environment 100 for integration with a corresponding article of footwear.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A regionalized-firmness midsole comprising:
at least one fused pre-formed ethylene vinyl acetate biscuit having a first density and formed into a first shape in a first molding process, wherein the first shape corresponds to a portion of a receiving area of a heat press mold for a second molding process;
a quantity of fused pelletized ethylene vinyl acetate, wherein the quantity of pelletized ethylene vinyl acetate has a second density, wherein the at least one pre-formed ethylene vinyl acetate biscuit is arranged within the quantity of pelletized ethylene vinyl acetate in a receiving area of a heat press prior to fusing the at least one pre-formed ethylene vinyl acetate and the quantity of pelletized ethylene vinyl acetate during the second molding process.

2. The regionalized-firmness midsole according to claim 1, wherein the regionalized-firmness midsole includes a first region and a second region, and wherein the first region and the second region are separated by a boundary.

3. The regionalized firmness midsole according to claim 2, wherein a level of hardness of the first region is established according to the first density, and wherein a level of hardness of the second region is established according to the second density.

4. The regionalized firmness midsole according to claim 2, wherein a color of the first region is based on a color of the ethylene vinyl acetate biscuit, and wherein a color of the second region is based on a color of the second quantity of pelletized phylon.

5. The regionalized-firmness midsole according to claim 1, wherein a first hardness of the ethylene vinyl acetate biscuit is established by the first density, and a second hardness of the quantity of pelletized phylon is established by the second density, wherein the first hardness and the second hardness are located on the regionalized midsole according to specifications provided by a customer.

6. A regionalized-firmness midsole comprising:
    a first fused pre-formed ethylene vinyl acetate biscuit having a first density molded into a first shape in a first molding process;
    a second fused pre-formed ethylene vinyl acetate biscuit having a second density molded into a second shape in a second molding process; and
    a third fused pre-formed ethylene vinyl acetate biscuit having a third density molded into a third shape in a third molding process, wherein the first shape, the second shape, and the third shape are complementary and are fused together within a cavity of a heat press mold in a fourth molding process.

7. The regionalized-firmness midsole according to claim 6, wherein the first fused pre-formed ethylene vinyl acetate biscuit, the second fused pre-formed ethylene vinyl acetate biscuit, and the third fused pre-formed ethylene vinyl acetate biscuit are arranged within the molding cavity of the heat press mold according to performance specifications associated with a type of article of footwear.

8. The regionalized-firmness midsole according to claim 6, wherein the first fused pre-formed ethylene vinyl acetate biscuit, the second fused pre-formed ethylene vinyl acetate biscuit, and the third fused pre-formed ethylene vinyl acetate biscuit are arranged within the molding cavity of the heat press mold according to specifications provided by a customer.

9. The regionalized-firmness midsole according to claim 6, wherein the regionalized-firmness midsole includes a first region and a second region are separated by a first boundary, and the second region and a third region are separated by a second boundary.

10. The regionalized firmness midsole according to claim 6, wherein a level of hardness of the first region is established according to the first density, a level of hardness of the second region is established according to the second density, and a level of hardness of the third region is established by the third density.

11. The regionalized-firmness midsole according to claim 9, wherein the first region comprises a first color, the second region comprises a second color, and the third region comprises a third color.

12. A regionalized-firmness midsole that is fabricated by fusing at least one pre-formed phylon biscuit with pelletized phylon during a heat press operation comprising:
    providing the at least one pre-formed phylon biscuit;
    providing a quantity of the pelletized phylon, wherein the at least one pre-formed biscuit having a first density and the quantity of pelletized phylon having a second density;
    arranging the at least one pre-formed phylon biscuit within the quantity of pelletized phylon accommodated by a receiving area of a heat press; and
    integrating the at least one pre-formed phylon biscuit with the quantity of pelletized phylon upon completing the heat press operation.

13. The regionalized-firmness midsole of claim 12, wherein arranging the at least one pre-formed phylon biscuit within the quantity of pelletized phylon comprises:
    receiving specifications from a customer; and
    locating the at least one pre-formed phylon biscuit within the quantity of pelletized phylon based on the customer specifications.

14. The regionalized-firmness midsole of claim 12, wherein arranging the at least one pre-formed phylon biscuit within the quantity of pelletized phylon comprises:
    receiving specifications from a customer;
    selecting the first density of the at least one pre-formed phylon biscuit based on the customer specifications; and
    selecting the second density of the quantity of pelletized phylon based on the customer specifications.

15. The regionalized-firmness midsole of claim 14, the integrating further comprises employing a divider to physically compartmentalize the receiving area of the heat press into a first zone and a second zone.

16. The regionalized-firmness midsole according to claim 12, wherein the regionalized-firmness midsole includes a first region and a second region, and wherein the first region and the second region are separated by a boundary.

17. The regionalized-firmness midsole according to claim 16, wherein a level of hardness of the first region is established according to the first density, and wherein a level of hardness of the second region is established according to the second density.

18. The regionalized-firmness midsole according to claim 16, wherein a color of the first region is based on a color of the at least one pre-formed phylon biscuit, and wherein a color of the second region is based on a color of the quantity of pelletized phylon.

* * * * *